(No Model.)
D. T. CHAMBERS.
SHOE FASTENING.
No. 307,092. Patented Oct. 28, 1884.
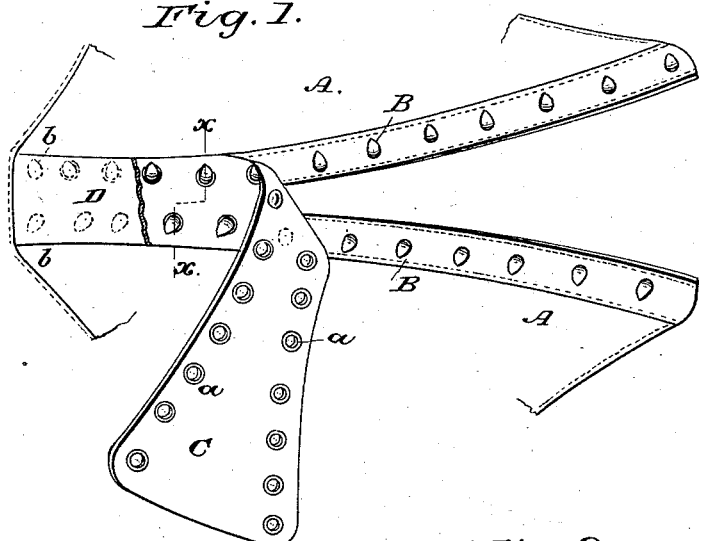
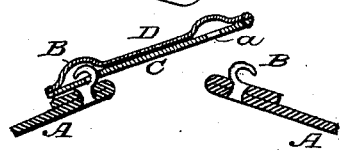
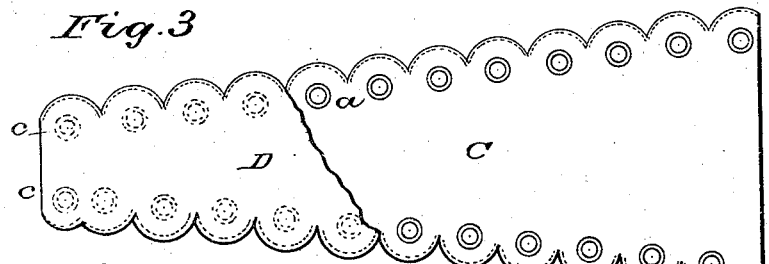
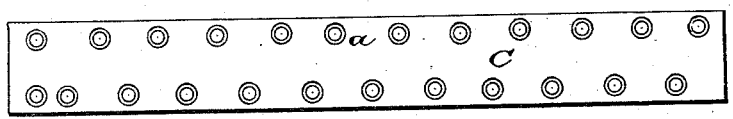
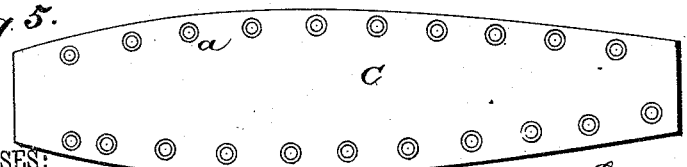
WITNESSES:
Fred. G. Dieterich
Edw. H. N. Byrn
INVENTOR.
Daniel T. Chambers
By Munn & Co
ATTORNEYS.

UNITED STATES PATENT OFFICE.

DANIEL T. CHAMBERS, OF WASHINGTON, DISTRICT OF COLUMBIA, ASSIGNOR OF ONE-FOURTH TO JULIUS A. KREMER, OF COLUMBUS, OHIO.

SHOE-FASTENING.

SPECIFICATION forming part of Letters Patent No. 307,092, dated October 28, 1884.

Application filed March 27, 1884. (No model.)

*To all whom it may concern:*

Be it known that I, DANIEL THOMAS CHAMBERS, a citizen of the United States, residing at Washington city, District of Columbia, have invented certain new and useful Improvements in Shoe-Fastenings, of which the following is a description.

Figure 1 is a top view of the slitted portion of a lace-shoe, showing my invention applied thereto. Fig. 2 is a cross-section through the line $x\ x$ of Fig. 1. Figs. 3, 4, and 5 are views of modified shapes of the blind strap-lace, Fig. 3 being shown with a part of the facing-strip or cover D thereon.

My invention relates to a novel shoe-fastening which I call a "blind strap-lace," the same being composed of two thicknesses of material, and used in the place of the ordinary lacing-cord or shoestring, and being provided in the under layer or thickness with eyelets along each of its edges, which are adapted to be successively caught over the projecting hooks on the edges of the slit in the shoe, as hereinafter fully described.

In the drawings, A represents a portion of the upper of a lace-shoe having the usual slit, and the edges of which slit are provided with re-enforcing strips, in each of which is seated a row of lacing-hooks, B. The lowest hook, $b$, of each series is so disposed on the strip as to be exactly opposite the lowest hook of the opposite series; but above these the hooks on one side alternate with those on the other side, so as to occupy a zigzag relation. These hooks are seated in the slit-strips so as to point obliquely downward and away from each other, as shown in Fig. 1.

C D is the blind strap-lace. This consists of a pliant strap of leather, textile fabric, or other suitable material, which corresponds somewhat to the tongue of a lace-shoe, but which, instead of being disposed inside of the shoe, as is a tongue, is arranged upon the outside of the shoe and covering the slit-opening. This strap has its underneath portion, C, provided with a series of holes, $a$, with or without eyelets in them, which are to be fastened over and upon the hooks B on each side of the shoe-slit. The outer portion, D, of these straps is in the nature of a blind fly that covers the eyelets or holes, and also the ends of the hooks. These straps may have scalloped or ornamental edges, as in Fig. 3, or may be made plain, as in Figs. 1, 4, and 5. In any case they cover the slit-opening perfectly, and exclude rain, dust, and mud. To accommodate this form of fastening to different widths or shapes of feet, these straps are made of such variable shape as to meet the wants of any particular shape. Thus, if the ankle and instep are very large, a very considerable taper is given to the form of the strap, as in Fig. 3. If, however, the ankle and instep are small, nearly a straight strap is used, as in Fig. 4; or if, as in some cases, there is a high or thick instep and a small ankle, the strap is made largest in the middle, as in Fig. 5. These straps are made of these different shapes for each graded size to meet the requirements of any particular form of foot, and series of these different shapes are kept in stock by the dealer, the idea being to fit the foot perfectly once for all, and the shoe being once properly fitted and adjusted on the foot, it always preserves that fit without needing subsequent adjustment, and there is no transfer of looseness from one part to the other, as is the case with a cord-laced shoe, and no necessity for setting the buttons to a new position to fit the foot, as is the case with nearly all ready-made buttoned shoes.

In applying the blind strap-lace to the shoe the hand is inserted into the shoe and the two lower hooks, $b\ b$, are pinched together until they are in position to register with and pass through the two lowest eyelets or holes, $c\ c$, of the strap. Then the eyelets of the strap are successively hooked over the hooks, first upon one side and then upon the other, until the top is reached.

If desired, an extra fastening or modified construction of hook may be used at the top to make the final fastening; but if the hooks and eyelets are properly made and seated this will not be necessary.

In connection with this blind strap-lace the ordinary inner tongue may be used, if desired; but its office is sufficiently performed by the blind strap-lace to dispense with said tongue.

In opening the shoe the strap is unhooked first upon one side and then upon the other until the last two hooks are reached, from which the strap is not detached, but is allowed to be permanently hooked therein, the strap maintaining its connection thereto by reason of the fact that it cannot be detached without pinching together the lower hooks of the shoe.

I do not confine myself to any particular material for the strap, nor to any particular form of eyelet, nor to any particular form of lacing-hook, as these may be varied without departing from my invention. It is also obvious that the shoe-slit may be either in front or on the side or at the back.

Having thus described my invention, what I claim as new is—

1. The combination, with a shoe having a slit or opening therein, with a row of lacing-hooks on each side, of a blind strap or lacing-tongue of two thicknesses or layers of material, having eyelets along its edges in the inner thickness, adapted to be applied outside the shoe and to fasten over the hooks, as and for the purpose described.

2. The blind-strap lacing consisting of the eyeleted piece C and the outer blind fly-strap, D, in combination with a shoe having a slit-opening, with hooks upon each side of the same, as described.

3. A lacing-strap consisting of an eyeleted section, C, of any suitable form, covered by a blind fly, D, as and for the purpose described.

DANIEL T. CHAMBERS.

Witnesses:
SOLON C. KEMON,
CHAS. A. PETTIT.